US012586702B2

(12) United States Patent
Brittles et al.

(10) Patent No.: US 12,586,702 B2
(45) Date of Patent: Mar. 24, 2026

(54) HIGH TEMPERATURE SUPERCONDUCTOR MAGNET

(71) Applicant: Tokamak Energy Ltd, Abingdon (GB)

(72) Inventors: Greg Brittles, Abingdon (GB); Marcel Kruip, Abingdon (GB); Tony Langtry, Abingdon (GB); George Smith, Abingdon (GB)

(73) Assignee: Tokamak Energy Ltd, Abingdon (GB)

( * ) Notice: Subject to any disclaimer, the term of this patent is extended or adjusted under 35 U.S.C. 154(b) by 0 days.

(21) Appl. No.: 18/949,277

(22) Filed: Nov. 15, 2024

(65) Prior Publication Data

US 2025/0069791 A1 Feb. 27, 2025

Related U.S. Application Data

(63) Continuation of application No. 17/285,172, filed as application No. PCT/GB2019/052926 on Oct. 14, 2019, now Pat. No. 12,183,507.

(30) Foreign Application Priority Data

Oct. 15, 2018 (GB) ...................................... 1816762
Jan. 7, 2019 (GB) ...................................... 1900177

(51) Int. Cl.

| | |
|---|---|
| ***H01F 6/06*** | (2006.01) |
| ***G21B 1/05*** | (2006.01) |
| ***H01F 27/32*** | (2006.01) |
| ***H01F 41/04*** | (2006.01) |
| ***H01F 41/10*** | (2006.01) |

(52) U.S. Cl.
CPC ............... *H01F 6/06* (2013.01); *G21B 1/057* (2013.01); *H01F 27/32* (2013.01); *H01F 41/048* (2013.01); *H01F 41/10* (2013.01)

(58) Field of Classification Search
None
See application file for complete search history.

(56) References Cited

U.S. PATENT DOCUMENTS 6,133,814 A 10/2000 Okada et al.
6,745,059 B2 6/2004 Buczek et al.
(Continued)

FOREIGN PATENT DOCUMENTS

CN 102810378 B 9/2014
CN 105637592 A 6/2016
(Continued)

OTHER PUBLICATIONS

Machine translation of Iwai [WO 2017094305] (Year: 2017).*
(Continued)

*Primary Examiner* — Bernard Rojas
(74) *Attorney, Agent, or Firm* — Michael Best & Friedrich LLP

(57) ABSTRACT

A High Temperature Superconductor, HTS, magnet comprising a coil formed of nested concentric windings. Each winding comprises HTS material. The HTS magnet further comprises a conductor element comprising an electrical contact surface through which to supply electric current to a portion of at least one of the windings. The surface provides electrical contact between the conductor element and an axial edge of the coil substantially around the path of the at least one of the windings.

25 Claims, 9 Drawing Sheets

(56) References Cited

U.S. PATENT DOCUMENTS

| | | | |
|---|---|---|---|
| 10,861,626 | B2 | 12/2020 | Kim et al. |
| 2009/0315655 | A1 | 12/2009 | Damiani et al. |
| 2010/0022396 | A1 | 1/2010 | Alexander et al. |
| 2013/0130914 | A1 | 5/2013 | Boffo et al. |
| 2018/0350494 | A1 | 12/2018 | Iwai et al. |

FOREIGN PATENT DOCUMENTS

| | | | |
|---|---|---|---|
| CN | 108461248 | A | 8/2018 |
| JP | H01222411 | A | 9/1989 |
| JP | H03237094 | A | 10/1991 |
| JP | H04291702 | A | 10/1992 |
| JP | H11186025 | A | 7/1999 |
| JP | H11329823 | A | 11/1999 |
| JP | 2002231523 | A | 8/2002 |
| JP | 2007080940 | A | 3/2007 |
| JP | 2007227167 | A | 9/2007 |
| JP | 2009049036 | A | 3/2009 |
| JP | 2012248731 | A | 12/2012 |
| JP | 2013055311 | A | 3/2013 |
| JP | 2013247291 | A | 12/2013 |
| JP | 2014216569 | A | 11/2014 |
| JP | 2015043364 | A | 3/2015 |
| JP | 2015162495 | A | 9/2015 |
| JP | 2015179764 | A | 10/2015 |
| JP | 2017010958 | A | 1/2017 |
| JP | 2017103352 | A | 6/2017 |
| JP | 2017112254 | A | 6/2017 |
| JP | 2017117980 | A | 6/2017 |
| JP | 2017204333 | A | 11/2017 |
| JP | 2017224654 | A | 12/2017 |
| JP | 201898420 | A | 6/2018 |
| JP | 2018101465 | A | 6/2018 |
| WO | 2017061563 | A1 | 4/2017 |
| WO | 2017094305 | A1 | 6/2017 |
| WO | 2018078326 | A1 | 5/2018 |

OTHER PUBLICATIONS

Australian Patent Office Action for Application No. 2024200590 dated Feb. 14, 2025 (4 pages).

International Search Report and Written Opinion for Application No. PCT/GB2019/052926 dated Mar. 25, 2020 (17 pages).

International Preliminary Report on Patentability for Application PCT/GB2019/052926 dated Dec. 10, 2020 (10 pages).

United Kingdom Intellectual Property Office Search Report for Application No. GB1816762.7 dated Mar. 14, 2019 (8 pages including corrected search report copy).

United Kingdom Intellectual Property Office Search Report for Application No. GB1900177.5 dated Jul. 9, 2019 (4 pages).

Ito et al., "Proposal of Electrical Edge Joint for a Demountable High-Temperature Superconducting Magnet", IEEE Transactions on Plasma Science, vol. 40, No. 5, 2012, pp. 1446-1452.

Ito et al., "Mechanical and Electrical Characteristics of a Bridge-Type Mechanical Lap Joint of HTS STARS Conductors", IEEE Transactions on Applied Superconductivity, vol. 26, No. 2, 2016, 10 pages.

First Office Action issued from the Chinese Patent Office for related Application No. 201980068145.6 dated Jun. 28, 2022 (16 Pages with English Translation).

European Patent Office Action for Related Application No. 22212720.1 dated Mar. 14, 2023 (14 pages).

Japanese Patent Office Action for Application No. 2022-125469 dated Sep. 5, 2023 (8 pages including English translation).

Korean Patent Office Action for Application No. 10-2021-7040008 dated Apr. 1, 2024 (25 pages including English translation).

Japanese Patent Office Action for Application No. 2022-125469 dated Jan. 23, 2024 (14 pages including English translation).

Japanese Patent Office Action for Application No. 2024069916 dated May 7, 2025 (10 pages including English machine translation).

* cited by examiner

HIGH TEMPERATURE SUPERCONDUCTOR MAGNET

CROSS-REFERENCE TO RELATED APPLICATIONS

This application is a continuation of U.S. patent application Ser. No. 17/285,172 filed on Apr. 14, 2021, which is a Section 371 national phase entry of PCT/GB2019/052926 filed on Oct. 14, 2019, which claims priority to GB 1900177.5 filed on Jan. 7, 20219 and GB 1816762.7 filed on Oct. 15, 2018.

TECHNICAL FIELD

The present invention relates to high temperature superconductor (HTS) magnets. In particular, it relates to the supply of electrical current to HTS magnets.

BACKGROUND

Superconducting materials are typically divided into "high temperature superconductors" (HTS) and "low temperature superconductors" (LTS). LTS materials, such as Nb and NbTi, are metals or metal alloys whose superconductivity can be described by BCS theory. All low temperature superconductors have a critical temperature (the temperature above which the material cannot be superconducting even in zero magnetic field) below about 30K. The behaviour of HTS material is not described by BCS theory, and such materials may have critical temperatures above about 30K (though it should be noted that it is the physical differences in superconducting operation and composition, rather than the critical temperature, which define HTS material). The most commonly used HTS are "cuprate superconductors"—ceramics based on cuprates (compounds containing a copper oxide group), such as BSCCO, or ReBCO (where Re is a rare earth element, commonly Y or Gd). Other HTS materials include iron pnictides (e.g. FeAs and FeSe) and magnesium diborate ($MgB_2$).

ReBCO is typically manufactured as tapes, with a structure as shown in FIG. 1. Such tape 100 is generally approximately 100 microns thick, and includes a substrate 101 (typically electropolished "hastelloy" approximately 50 microns thick), on which is deposited by IBAD, magnetron sputtering, or another suitable technique a series of buffer layers known as the buffer stack 102, of approximate thickness 0.2 microns. An epitaxial ReBCO-HTS layer 103 (deposited by MOCVD or another suitable technique) overlays the buffer stack, and is typically 1 micron thick. A 1-2 micron silver layer 104 is deposited on the HTS layer by sputtering or another suitable technique, and a copper stabilizer layer 105 (or "cladding") is deposited on the tape by electroplating or another suitable technique, which often completely encapsulates the tape. Electrical current is typically coupled into the tape 100 through the cladding.

The substrate 101 provides a mechanical backbone that can be fed through the manufacturing line and permit growth of subsequent layers. The buffer stack 102 is required to provide a biaxially textured crystalline template upon which to grow the HTS layer, and prevents chemical diffusion of elements from the substrate to the HTS which damage its superconducting properties. The silver layer 104 is required to provide a low resistance interface from the ReBCO to the stabiliser layer, and the stabiliser layer 105 provides an alternative current path in the event that any part of the ReBCO ceases superconducting (enters the "normal" state).

HTS magnets can be formed by winding HTS tape, such as the ReBCO tape 100 described above, into a coil. Common points of failure in such HTS magnets are places where individual tapes or cable depart from the winding pack into joint (i.e. electrical connection) regions.

FIG. 2 shows schematically a "conventional" electrical joint to a coil 201 comprising HTS tape 100. The outer winding of the coil 201 has been partially pulled away from the winding pack to create a "flying lead" 202. An electrical joint fixture 203 is applied to the flying lead 202 in order to supply electrical current to the coil 201.

In flying lead joints, such as those shown in FIG. 2, the HTS tapes are vulnerable to cyclical movement under electromagnetic (EM) forces and thermal contraction, causing them to degrade during normal operation. Often these "exposed" sections of HTS tape are also at further risk because there are no adjacent HTS turns (windings) with which to share current in the event of a critical current degradation, meaning that these sections do not benefit from proximity to the main winding pack for heat and/or current dissipation.

These flying lead regions are also vulnerable to damage during magnet winding and assembly processes, since the individual tapes are fragile and easily bent by mishandling. Moreover, in the flying lead scheme it is often the case that expensive precision machined parts must be made to guide and support the flying leads as they move away from the winding pack and into a joint fixture.

Another problem which can occur in superconducting magnets is quenching. Quenching occurs when a part of the superconducting wire or coil enters the resistive state. This may occur due to fluctuations in temperature or magnetic field, or physical damage or defects in the superconductor (e.g. by neutron irradiation if the magnet is used in a fusion reactor). Due to the high currents present in the magnet, when even a small part of the superconductor becomes resistive, it quickly heats up. As mentioned above, superconducting wires are provided with some copper stabilizer for quench protection. The copper provides an alternative path for current if the superconductor becomes normal. The more copper that is present, the slower the temperature rises in the hot spot that forms around a region of quenched conductor.

There is therefore a need for an HTS magnet which avoids or mitigates some or all of these drawbacks.

SUMMARY

It is an object of the present invention to provide an HTS magnet which addresses, or at least alleviates, the problems described above.

According to a first aspect of the invention there is provided an HTS magnet. The HTS magnet comprises: a coil formed of nested concentric windings, each winding comprising HTS material; and a conductor element comprising an electrical contact surface through which to supply electric current to a portion of at least one of the windings. The surface provides electrical contact between the conductor element and an axial edge of the coil substantially around the path of the at least one of the windings.

Each winding may comprise HTS tape and cladding electrically connected to the HTS tape, the electrical contact being provided to the cladding.

The electrical contact surface may provide electrical contact to the axial edge of the coil around more than 20%, more than 50% or more than 80% of the path of the at least one of the windings. The electrical contact surface may be ring-shaped.

The HTS magnet may comprise a plate extending across one or more of the other windings, the conductor element formed integrally with the plate or provided thereon. The conductor element may protrude from a face of the plate and the plate further comprises a dielectric or electrically resistive layer for electrically insulating the face of the plate from the portion of the one or more of the other windings.

As used herein, the term "electrically resistive" layer means a layer that has an electrical resistance that is larger than the electrical resistance between the conductor element and the coil and the electrical resistance between the turns of the coil (i.e. the radial electrical resistance of the coil). The electrically resistive layer may nevertheless be thermally conducting, thereby allowing heat to be transferred from (or to) the coil more effectively. The electrically resistive layer may or may not be a dielectric layer. A non-dielectric, but electrically-resistive layer may be preferred in cases where a dielectric would be susceptible to radiation damage, e.g. when the coils are part of a tokamak fusion reactor.

The HTS magnet may comprise an interfacial conductor layer extending across the one or more other windings to transfer heat and/or electrical current from the edge of the or each winding. The interfacial conductor layer may comprise brass and/or stainless steel. Other "solderable" metals can also be used, i.e. metals to which solder can adhere in order to provide electrical contact. The interfacial conductor layer may patterned by varying its thickness, for example, to produce a "web-like" pattern.

The coil may comprise electrical insulation between the windings.

The HTS magnet may comprise one or more sensors and/or one or more heaters disposed between the plate and the coil.

The electrical contact surface may provide electrical contact to either the innermost or the outermost winding of the coil. The electrical contact surface may provide electrical contact across a discontinuity in the windings. For example, if the coil is formed from two lengths of HTS tape, the electrical contact surface may act as an electrical joint to join the tapes in series.

The HTS magnet may further comprise another conductor element comprising an electrical contact surface for receiving electric current from a portion of another at least one of the windings. The surface provides electrical contact to the or another axial edge of the coil substantially around the path of the other at least one of the windings. The electrical contact surfaces may provide electrical contact to opposing faces of the coil.

The HTS magnet may further comprise one or more additional coils, the or each additional coil having conductor elements for providing electrical contact top opposing faces of that coil, the coils being stacked axially and electrically connected to one another through their respective conductor elements. The adjacent axially stacked coils may be wound in opposite directions.

The HTS magnet may comprise two or more concentrically nested coils each having respective conductor elements, each coil being electrically connected to an adjacent coil by an electrical connection between respective conductor elements of the coils. The electrical connection may be flexible to accommodate movement of the coils relative to one another. The HTS magnet may comprise one or more intervening supports located between adjacent coils for intercepting radial forces.

The respective HTS tapes of adjacent coils may differ in one or more of: thickness; composition; width; and number.

According to a second aspect of the present invention there is provided an HTS magnet comprising first and second coils, each coil formed of nested concentric windings, each winding comprising HTS material; and first and second conductor elements, each conductor element providing an electrical connection between the coils. Each conductor element comprises: a first electrical contact surface through which to transfer electric current to or from a portion of at least one of the windings of the first coil; and a second electrical contact surface through which to transfer electric current to or from a portion of at least one of the windings of the second coil. Each surface provides electrical contact between the respective conductor element and an axial edge of the respective coil substantially around the path of the at least one of the windings.

The electrical resistance of the electrical connection provided by the first conductor element divided by the electrical resistance of the electrical connection provided by the second conductor element may be more than 1.5, more than 3, or more than 10. The areas of the electrical contact surfaces of the second conductor element may be greater than the areas of the electrical contact surfaces of the first conductor element.

The first conductor element may be located radially outwards from the second conductor element. This may allow the first conductor element to be placed in a region of lower magnet field.

The first or the second conductor element may comprise a variable resistor or switch. The variable resistor or switch may comprise HTS material.

According to a third aspect of the present invention there is provided a tokamak comprising an HTS magnet as described above. The HTS magnet is configured to provide a toroidal magnetic field or a poloidal magnetic field.

According to a fourth aspect of the present invention there is provided a method of generating a semi-persistent current in the HTS magnet described above. The method comprises: preparing each of the coils in a superconducting state; connecting a power supply across the coils; and disconnecting the power supply.

The second conductor element may comprise HTS material and the method may comprise, after connecting the power supply across the coils, changing the HTS material from a normal state to a superconducting state.

According to a fifth aspect of the present invention there is provided a method of making an electrical connection to an HTS magnet comprising a coil formed of nested concentric windings, each winding comprising HTS material. The method comprises: applying a dielectric or electrically resistive layer to partially cover a face of the coil; applying a conductor plate to the dielectric or electrically resistive layer; and forming an electrical contact between the conductor plate and an axial edge of the coil substantially around the path of at least one of the windings.

The method may further comprise applying an interfacial conductor layer between the dielectric or electrically resistive layer and the coil, the interfacial conductor layer extending across one or more of the other windings to transfer heat or electrical current from the edge of the or each winding.

According to a sixth aspect of the present invention there is provided a conductor plate for supplying current to an axial edge of a coil formed of nested concentric windings. The conductor plate comprises a ring-shaped conductor element formed integrally with the plate or provided thereon. The conductor element comprises an electrical contact surface for providing electrical contact between the conductor element and the coil. The conductor element further comprises a dielectric or electrically resistive layer on the conductor plate for providing an electrically insulating barrier adjacent to the electrical contact surface.

The conductor plate may further comprise an interfacial conductor layer extending partially or wholly across the dielectric or electrically resistive layer. The interfacial conductor layer is configured to transfer heat or electrical current from the edge of the or each winding.

According to a seventh aspect of the present invention there is provided a method of manufacturing a conductor plate for supplying current to an axial edge of a coil formed of nested concentric windings. The method comprises: providing a ring-shaped conductor element formed integrally with the plate or provided thereon, the conductor element comprising an electrical contact surface for providing electrical contact between the conductor element and the coil; and curing a composite of fibres and resin on the conductor plate to form a dielectric or electrically resistive layer on the conductor plate for providing an electrically insulating barrier adjacent to the electrical contact surface.

The curing may comprise heating the composite to a target temperature, maintaining the composite at the target temperature for a period, and cooling the composite.

The rate of the heating may be less than 1° C. per minute, preferably less than 0.3° C. per minute. The rate of the cooling may be less than 1° C. per minute, preferably less than 0.4° C. per minute. The target temperature may be greater than or equal to 180° C. The period may be greater than 1 hour and, preferably, greater than 2 hours.

Also described herein is a method of forming an electrical and/or thermal connection to a copper surface, comprising providing a layer of silver on the copper surface and providing a layer of indium on the silver surface, whereby the electrical and/or thermal connection can be formed to the layer of indium. Also described herein is an electrical and/or thermal joint comprising a copper surface, a layer of silver and a layer of indium, the layer of silver being located directly between the copper surface and the layer of indium.

DETAILED DESCRIPTION

A solution to the above problems is proposed here in which an electrical connection is made to an HTS magnet coil through the axial edge of the coil, so that electrical current can be supplied or received through a face of the coil. This form of connection allows a dense winding pack of HTS tape to be preserved, such that none of the HTS tapes must depart from the coil. For example, the electrical connection may be provided by a conductor in the shape of a ring located on top of a face of the coil, with the conductor contacting the upwards facing edge of the winding around the circumference of the coil. This arrangement or "ring joint" can be used to minimise the risk of point failures in the magnet, both during assembly and operation. It also allows current to be supplied to or extracted from HTS coils without the need for flying leads, eliminating the need for many subsidiary parts, reducing cost and complexity and simplifying manufacture of HTS magnets. Such connections or joints may also improve the performance of HTS magnets as described below.

Although reference is made in this document to certain directions (e.g. up, down) or relative terms (e.g. above, on top of, below, etc.) it should be understood that these terms are used merely for the purpose of providing examples of the concepts described herein. Similarly, while the disclosure is exemplified with reference to "pancake" coils, i.e. largely planar coils formed of nested concentric windings, it will be understood from the discussion below that the disclosure is not limited to such coils.

Integration of ring joints into larger structures (described below as an Electro-Thermal Interface, "ETI", plates) also allows thermal connections, electrical insulation and sensors, which are often traditionally applied to the magnet separately, to be provided as a single unit. This simplifies the assembly process and allows these components to be manufactured independently of the HTS coil.

Figure 1:
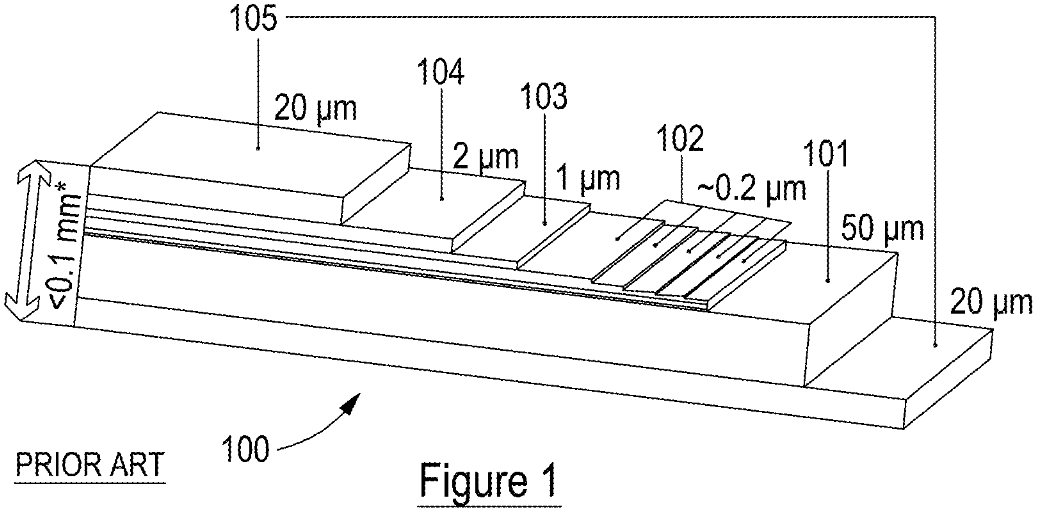
PRIOR ART Figure 1
FIG. 1 is a schematic perspective view of an HTS tape of the prior art.
Figure 2:
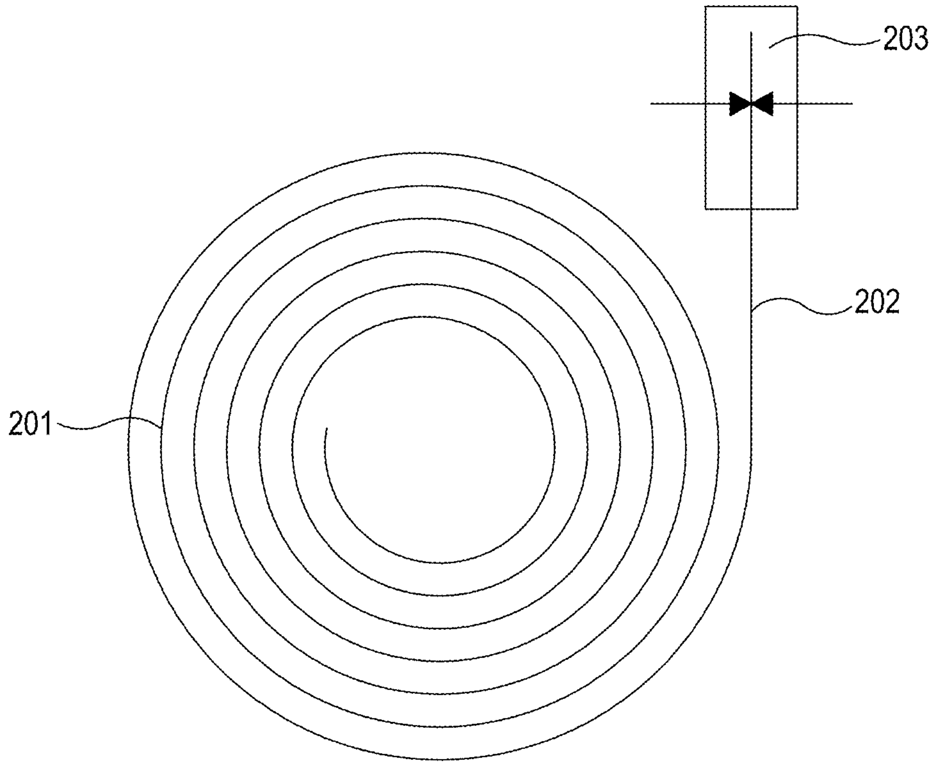
PRIOR ART Figure 2
FIG. 2 is a schematic plan view of a flying lead joint of the prior art.
Figure 3A:
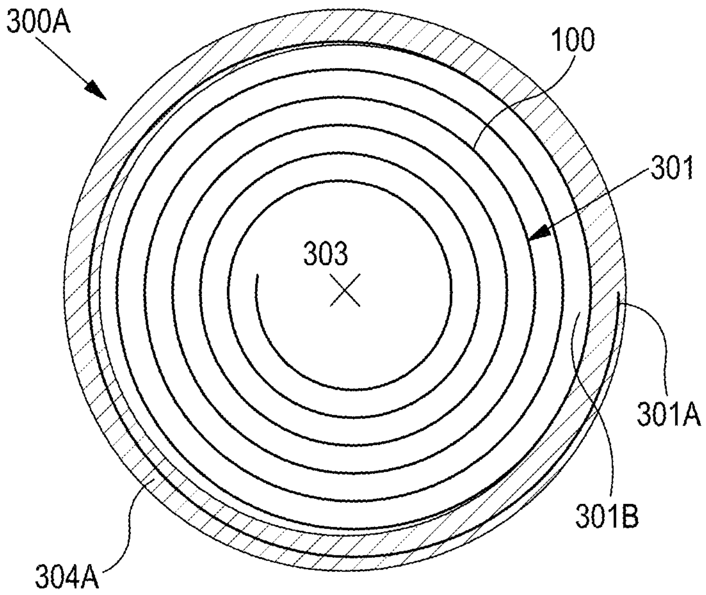
FIGS. 3A and 3B are schematic plan views of HTS magnets.
Figure 3B:
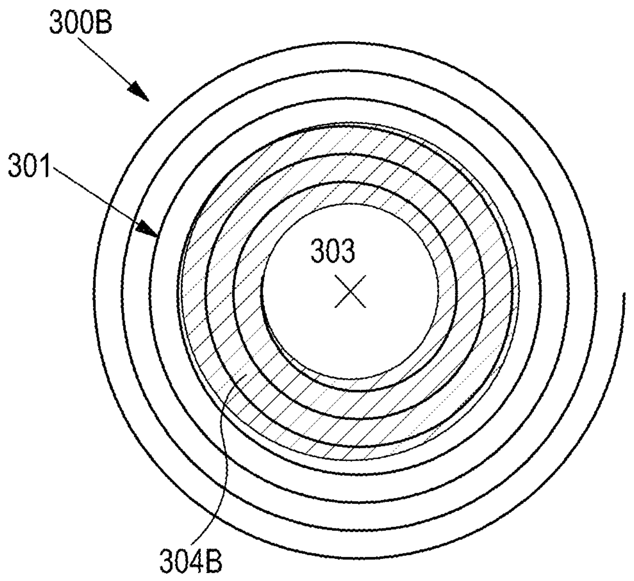

FIGS. 3A and 3B show schematic plan views of two possible implementations of a ring joint 300A, 300B for a pancake coil 301.

The coil 301 comprises nested concentric windings of HTS tape 100 in a predominantly planar arrangement. The HTS tape 100 is wound "face-to-face" so that the opposing edges of the tape 100 project along the axis 303 of the coil. Each complete winding corresponds to a complete revolution (turn) of the HTS tape 100 about the coil axis 303. The start and end points of the outermost winding are labelled in FIG. 3A by 301A and 301B.

The ring joints 300A, 300B are formed by respective ring conductors 304A, 304B. For clarity, the ring conductors 304A, 304B are shown behind the coil 301 in order to show the coil windings. Each ring conductor 304A, 304B comprises an annulus or ring made from a conducting material, preferably a metal such as copper. The ring conductors 200A, 200B contact the upper or lower edge of the windings in order to provide electrical contact to the coil 201. Ring conductor 300A is located at the outer radius of the coil 201, whilst ring conductor 200B is located at the inner radius of the coil 201. Each ring conductor 200A, 200B covers only a portion of the windings so that electrical current can be supplied to one end of the coil 201 and thereby circulates through the windings.

As the ring conductors 300A, 300B each provide electrical contact to different ends of the HTS tape 100, they may be used as a pair to drive electric current radially from the inside to the outside of the coil 301 (or vice versa). For example, the coil 201 may be provided (sandwiched)

between the pair of ring conductors 304A, 304B so that current can be supplied to one face of the coil 301 (e.g. the top) by one ring conductor 304A, pass through the windings of the coil 301 in order to generate a magnetic field, and then be received from the other face of the coil by the other ring conductor 304B.

The radial widths of the ring conductors 304A, 304B are chosen to trade off joint resistance against number of turns between joints. Joint resistance can be reduced by making the ring conductor 304A, 304B wider to cover more turns of the coil 301. However, as a result, the magnetic field produced by the magnet per unit current is reduced since the number of turns carrying the full magnet current is diminished. The opposite is true if the radial width is reduced.

Since ring joints can subtend a length on the order of the coil circumference, low resistance joints can typically be made with radially narrow ring conductors 304A, 304B that do not significantly diminish the field produced by the magnet. Although the ring conductors 304A, 304B in FIGS. 3A and 3B are shown extending slightly outside the outer/inner edges of the coil 301, the shape of the ring conductors can alternatively be more closely matched to the radial profile of the coil 301 to minimise the radial footprint of the coil 301 and ring joint 300A, 300B.

Although circular "pancake" coils are used in FIGS. 3A and 3B to illustrate the features of the ring joints 300A, 300B, it will be readily appreciated that these types of joint could be applied to other shapes of coil, such as to "D"-shaped toroidal field coils such as those as used in a tokamak. In such cases, the ring joints 300A, 300B need not be circular and may be shaped so as to follow the path of the coil windings. Similarly, it is not necessary that the "ring" conductors 304A, 304B extend completely around the path of the coil windings and, instead, they may extend only partially around the path of the coil windings. For example, for magnets of large radius and/or comprising thick HTS tape, it may be possible to form a low resistance joint using a ring conductor that extends only 20%, 50% or 80% of the way around the path of the windings, i.e. so that that the ring conductor subtends an angle of less than 360 degrees. Introducing a "break" in the ring conductor (by having it not extend completely around the path of the windings) may preferentially avoid the formation of parasitic current loops within the ring conductor, which may be useful in applications such as Nuclear Magnetic Resonance (NMR) or Magnetic Resonance Imaging (MRI). In other applications, such as a Tokamak (see below), for example, geometric restrictions and/or the presence of other components may necessitate such a break.

Ring joints may be provided as part of a larger structure, which may be termed a conductor plate or Electro-Thermal Interface (ETI) plate. ETI plates are, in general, composite metal/insulator/sensor plates which, as discussed below, can be attached to edge faces of HTS coils in order to perform a number of roles:

- A means of making electrical joints to and/or between HTS coils.
- A means of introducing a controlled resistor in parallel with an HTS coil to achieve "partial insulation". The geometry of the resistor can be shaped to adjust the dynamic electro-thermal behaviour of the coil.
- A means of forming a thermal interface to the HTS coil for cooling.
- A means of introducing thin electrical insulation between HTS coils and mechanically protecting the insulation from damage.
- A means of including ancillary items (such as sensors or heaters) in an HTS magnet without disturbing the HTS windings.

Figure 4:
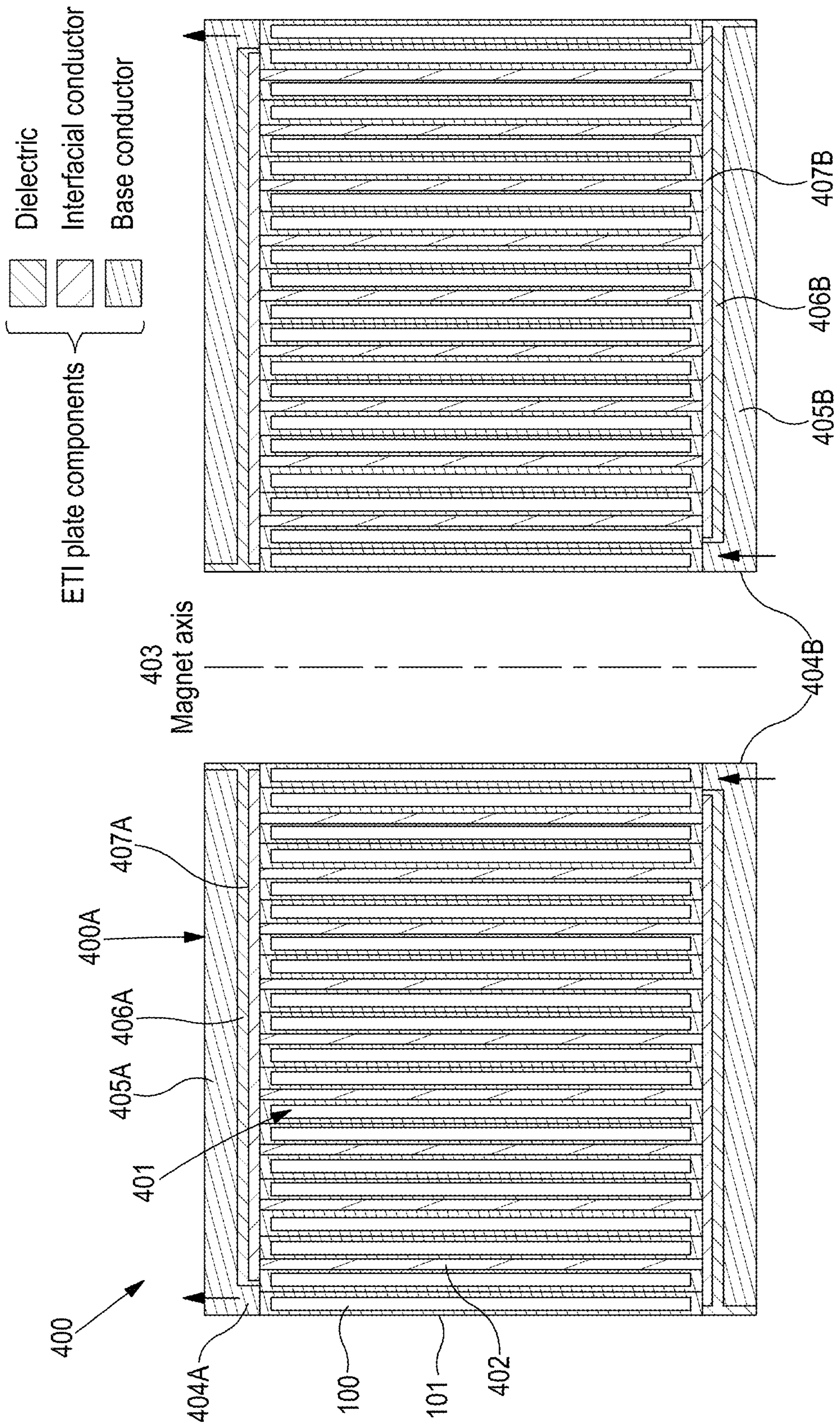
FIG. 4 is a schematic cross sectional view of an HTS magnet.

FIG. 4 shows a cross section through an exemplary magnet 400 comprising two ETI plates 400A, 400B applied to a single pancake coil 401. In this example, the coil 401 comprises two lengths of HTS tape 100 wound together around the magnet axis 303. The tapes 100 are clad in copper 101 as a "type 0 pair" (as described, for example, in WO2018/078326) so that each winding includes two tapes. An insulator 402 is provided between the windings of the HTS tapes 100 to prevent electrical current from flowing across the faces of the HTS tape, i.e. so that electric current injected into one end of the HTS tapes 100 is forced to circulate around the windings of the coil 401. The ETI plates 400A, 400B each comprise a respective ring conductor 404A, 404B forming a ring joint to either end of the HTS tapes 100. In this example, electric current is supplied to the coil 401 through the radially innermost end of the HTS tapes 100 using the bottom ETI plate 400B. The current flows around successive windings of the coil 301 before being received by the top ETI plate 400A through the ring conductor 404A at the radially outermost end of the HTS tapes 100.

Although the ETI plates 400A, 400B are in electrical contact with the coil 401 only through the ring conductors 404A, 404B, the plates themselves extend radially across the coil to form a "base conductor" layer 405A, 405B through which to supply current to (or receive current from) the ring joints and to provide a path to conduct heat away from the coil 301. In this example the base conductors 405A, 405B are formed from copper, although other conducting materials (e.g. metals) can also be used. The ring conductors 404A, 404B may be formed integrally with the base conductors 405A, 405B or affixed to them, e.g. by soldering.

By forming the ring conductors 404A, 404B on (or integral with) the ETI plates 400A, 400B, they can be made very narrow across their radial dimension (sub-millimetre if necessary) whilst still being easy to handle, in a way that would be difficult to achieve if the ring conductor were a standalone item. The large surface area provided by the base conductors 405A, 405B allows heat to be removed efficiently from the coil 401 and allows more flexibility in where electrical connections to the magnet can be placed.

The base conductor 405A, 405B in the ETI plates 400A, 400B can be made thin in order to minimise the temperature rise across it and to ensure that the coils are not spaced too far apart axially in order to avoid diluting the magnetic field strength. Alternatively, heat can also be extracted radially to a cooling bus at the coil 401 outer diameter or inner diameter, in which case the base conductor 405A, 405B should be made sufficiently thick to satisfy temperature requirements. The ETI plates 400A, 400B may also be structured to allow the one or more of the faces of the coil 401 to be cooled more effectively (i.e. without relying on heat conduction to the radial extremities of the coil). For example, the ETI plates 400A, 400B may include channels or pipes through which to flow a gas or liquid coolant in order to transfer heat away from the coil 401. Preferably, the channels or pipes may be provided on or within one or more of the base conductors 405A, 405B.

The use of ETI plates 400A, 400B for cooling provides an alternative approach to methods such as using thermally conducting pastes, which have inferior thermal conductance compared to solder and can be difficult to apply well in thin layers and complicate the manufacturing process.

The ETI plate 400A, 400B also includes a dielectric layer 406A, 406B to electrically insulate the edges of the HTS tape 100 from the base conductor 405A, 405B portions of the plates. The dielectric layers 406A, 406B are formed of a dielectric material, for example a glass fibre/resin composite, such as "pre-preg".

The ETI plates 400A, 400B further include an interfacial conductor layer 407A, 407B, which can be soldered to the coil 401 for excellent thermal and electrical contact. This layer acts as a radial resistor to control the thermal and electrical behaviour of the coil 401. Such "partial insulation", i.e. introduction of a controlled "turn-to-turn" resistor, provides a desirable balance between thermal stability and coil ramping time in HTS coils. The interfacial conductor layer is formed from a conducting material, preferably brass or stainless steel, since this material can be soldered and has an electrical resistivity much larger than copper, allowing it to be thicker and thus have a more easily controlled thickness. Such "Partial Insulation" (PI), i.e. introduction of a controlled "turn-to-turn" resistor, provides a desirable balance between thermal stability and coil ramping time in HTS coils. In particular, the use of layer extending across the windings of the coil may obviate the need for other forms of partial insulation, such as "wound-in" layers of metals such as stainless steel.

In some cases, the interfacial conductor layer 407A, 407B may be bonded to the dielectric layer 406A, 406B with glue. However, the glue must be able to withstand soldering temperatures without becoming structurally weakened as otherwise there is a tendency for the layers to delaminate during soldering, One way to overcome this problem is to use a glass fibre/resin composite, such as "pre-preg" as both the dielectric and bonding medium. For example, a composite such as "Prepreg MTC400" produced by "SHD Composites" can be used. By performing a relatively long curing process it is possible to elevate the glass transition temperature ($T_g$) of the composite above the typical soldering temperature of the coil. For example, the composite can be "post-cured" by heating at a rate of around 0.3° C./min to 180° C., holding for 2 hours, and then cooling at rate of around 0.3° C./min. This procedure can, for example, achieve a $T_a$ of 200° C., which allows the composite to withstand most soldering processes, which occur at lower temperatures. It may, however, not be possible to perform such a curing treatment with the ETI plate in-situ on the coil since the elevated temperatures and times would damage the coil (due to continuous degradation of HTS tapes that occurs as a function of temperature and time) and possibly damage or degrade any soldered connections which have already been made.

Although non-insulated coils can also be used, inclusion of insulator 402 increases the effectiveness of the "turn-to-turn" resistance by blocking off the alternative low resistance path between windings through the copper cladding of the HTS tapes 100.

The thickness of the ETI plates 400A, 400B (i.e. the full thickness including the ring conductor) is typically in the range 0.25-1.00 mm, with the thickness of the dielectric layer (when present) being typically in the range 10-100 μm and the thickness of the interfacial conductor (when present) is typically in the range 10-100 μm.

The solder used to bond the interfacial layer 407A, 407B to the windings of the coil 401 is typically PbSn. However, this material is so conductive that even a thin coat of PbSn on the interfacial layer 407A, 407B will provide a very low resistance current path, which will cause electrical current to bypass the interfacial layer 407A, 407B. To avoid this problem, a solder material is chosen as being one with a high resistivity, preferably one which has a higher resistivity than PbSn, e.g. a solder material which has a resistivity that is more than 10 times the resistivity of PbSn when the coil is being used in a magnet, e.g. at a temperature lower than the critical temperature of the ReBCO tape. For example, the solder material may be formed from PbBi, as this material has a resistivity which is about 50 times greater than that of PbSn. Similarly, PbBiSn can also be used. The higher resistance of the coating of PbBi (or PbBiSn) solder (compared with the PbSn solder coating) means that more current flows within the interfacial layer 407A, 407B.

Partially Insulating ETI plates offer the benefit of being highly flexible. The turn-to-turn resistance can be controlled by changing the thickness and composition of the interfacial conductor. The geometry of the interfacial conductor layer can be modified by use of lithography, such as by etching fragmented web-like patterns in order to intercept long range radial currents, or inductive spirals that provide impedance, both of which provide can permit a balance to be obtained between charging times and thermo-electric stability.

Thin electrical insulation between pancake coils is desirable to provide the necessary dielectric properties without introducing too large a temperature rise caused by heat flowing through it. However, since many common dielectric materials (such as polyimide sheets) are soft, they are vulnerable to puncture under the electromagnetic stresses encountered during magnet operation and assembly. By embedding the insulation inside an ETI plate, with metallic sheets protecting the insulation on both sides, the risk of puncture is minimal.

Since the ETI plate is a separate object to the coil, it can be replaced in order to change the behaviour of the coil. For example one may initially attach ETI plates with a thick interfacial conductor to safely operate the coil and determine its critical current. Once the maximum working current has been determined, the ETI plate can be changed to one which offers the ability to ramp the magnet more quickly within the known performance envelope of the magnet.

Figure 5:
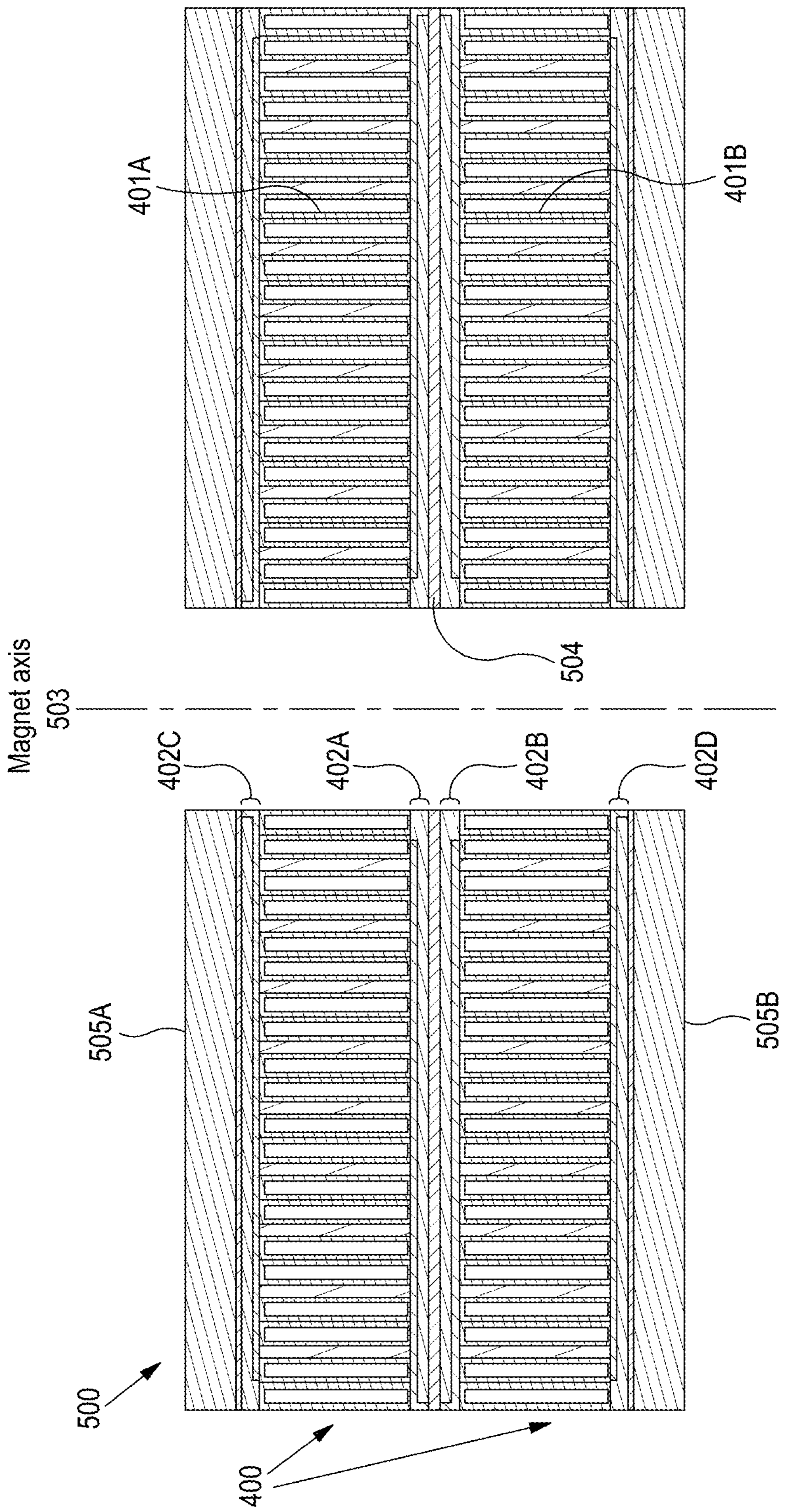
FIG. 5 is a schematic cross sectional view of an HTS magnet.

FIG. 5 shows a cross section through a magnet 500 comprising two axially-stacked magnets 400, each comprising a pancake coil 401A, 401B. Thermal and electrical joints between the coils 401A, 401B can be made by connecting the base copper layers of adjacent ETI plates 402A, 402B together after stacking. This can be done either by pressing axially (i.e. along the axis 503 of the magnet) and optionally adding a compliant conducting layer 504, such as an indium layer, between the magnets 400, or by soldering (although this requires heating up the entire magnet). A "NanoBond" ® technique can also be used in which a multilayer foil is inserted between the ETI plates 402A, 402B and a chemical reaction is initiated within the foil to generate heat to solder the foil to each of the plates.

In order that the thermal and/or electrical joints between the adjacent ETI plates 402A, 402B are effective it is preferable that the surface condition of the plates is good, e.g. clean of oxides. One way this can be achieved is to provide the base copper layer(s) of the ETI plates 402A, 402B, with a layer (e.g. a coating) of a noble metal, such as silver. A layer of silver is preferred because silver has a low affinity for oxygen and is also chemically compatible with indium, which allows high quality, pressed joints to be made using a compliant indium layer 504, Additional plates 505A, 505B, such as copper plates, may be provided axially on ETI plates 402C, 402D on either end of the magnet 500 in order to provide additional cooling or to provide electrical connections to the magnet 500.

A power supply (not shown) is connected across the plates 505A, 505B to supply electrical current to the magnet 500. In this example, the ring joints to each of the faces of the magnet are located at the radially outermost edges of the coils, while the ring joints connecting the two coils are located at the radially innermost edges of the coils. Electrical current therefore flows radially inwards through the windings of one of the coils, then axially between the coils and then radially outwards through the windings of the other coil. As the current flows in opposite directions through each coil, the coils 401A, 401B are wound in opposite directions (i.e. clockwise/anticlockwise) so that the magnetic field produced by each of the magnets 400 has the same polarity, thereby allowing very large magnetic fields to be generated. For example, the coils 401A and 401B can be prepared identically (i.e. wound in the same direction) and then one of the coils "flipped" with respect to the other before stacking to form the magnet 500. It will be appreciated that further pancake coils can be stacked in this manner, with further ETI plates between them.

As discussed above, the ETI plates may include channels or pipes through which to flow gas or liquid in order to transfer heat away from the coil(s). Such an arrangement is particularly effective for cooling axially-stacked magnets 400, such as those shown in FIG. 5. In particular, providing cooling channels or pipes in the ETI plates 402A, 402B located in between the coils allows heat to be more effectively transferred from the "body" of the coils, 401A, 401B.

Ring conductors in ETI plates can also be used to make electrical joints between nested/concentric pancake coils, i.e. joints that carry current in the radial direction, rather than the axial direction as described above. For example, a pancake coil can be enlarged by winding a second length of HTS tape around it, in which case, an electrical joint can be made between the ends of the two HTS tapes using a ring conductor, preferably in an ETI plate, i.e. the ring conductor is used to provide a joint across a discontinuity or break in the windings. An example of where this may be useful is for stress reduction in deep coils (those for which outer radius divided by inner radius is large, greater than ~3 for example). In such a situation, it is beneficial to subdivide the coil into multiple nested coils and intercept the forces generated by each, preventing a build-up of stress in the windings. In this case a radial joint between nested coils can be made with a suitable ring conductor in an ETI plate.

Figure 6:
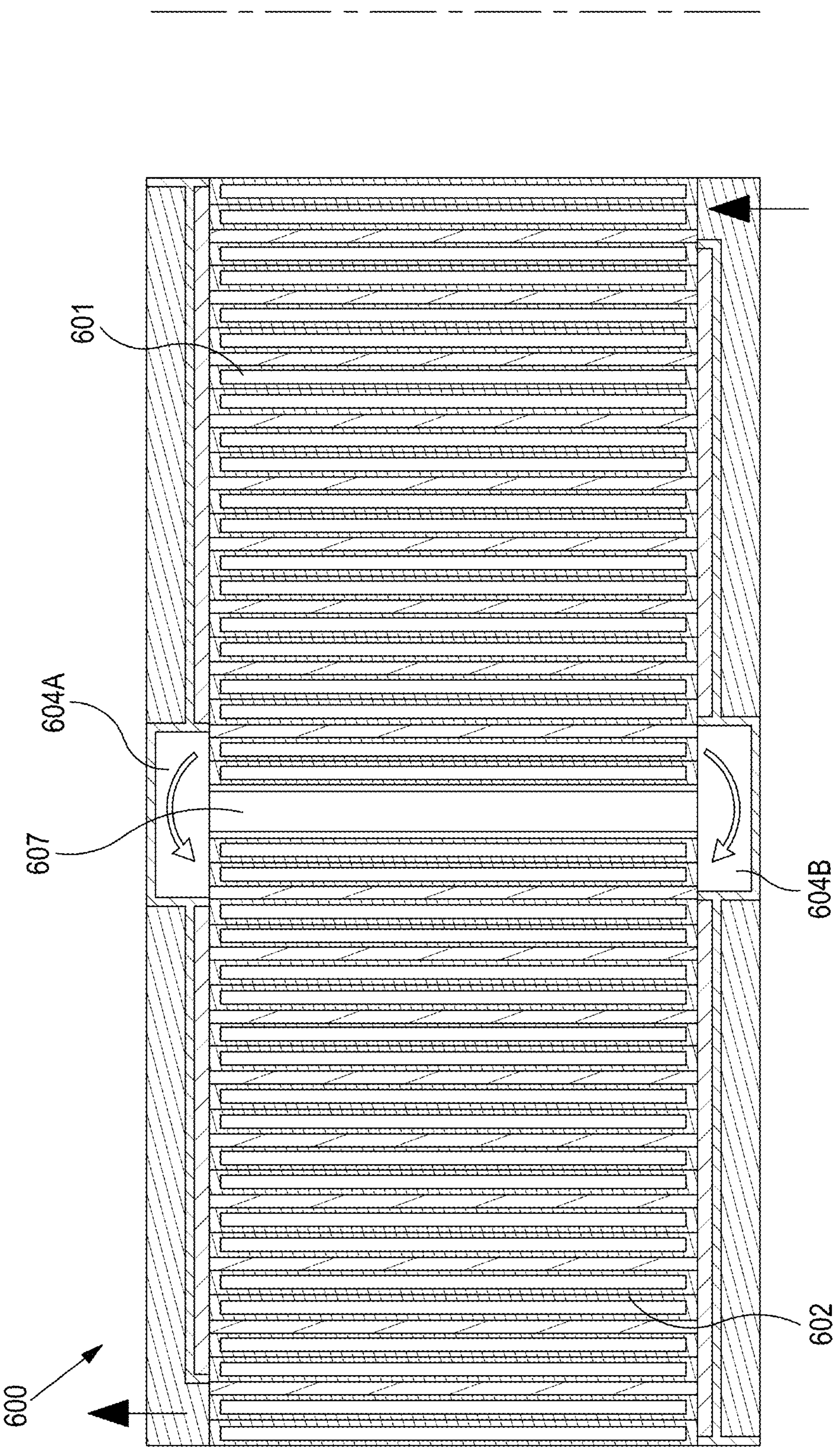
FIG. 6 is a schematic radial cross section view of an HTS magnet with a radial joint.

FIG. 6 shows a radial cross section through an HTS magnet 600 with two ring conductors 604A, 604B providing radial joints between an inner coil 601 and an outer coil 602. A mechanical support 607, such as a cylinder, is provided between the inner and outer coils 601, 602 to intercept radial forces between them.

Figure 7:
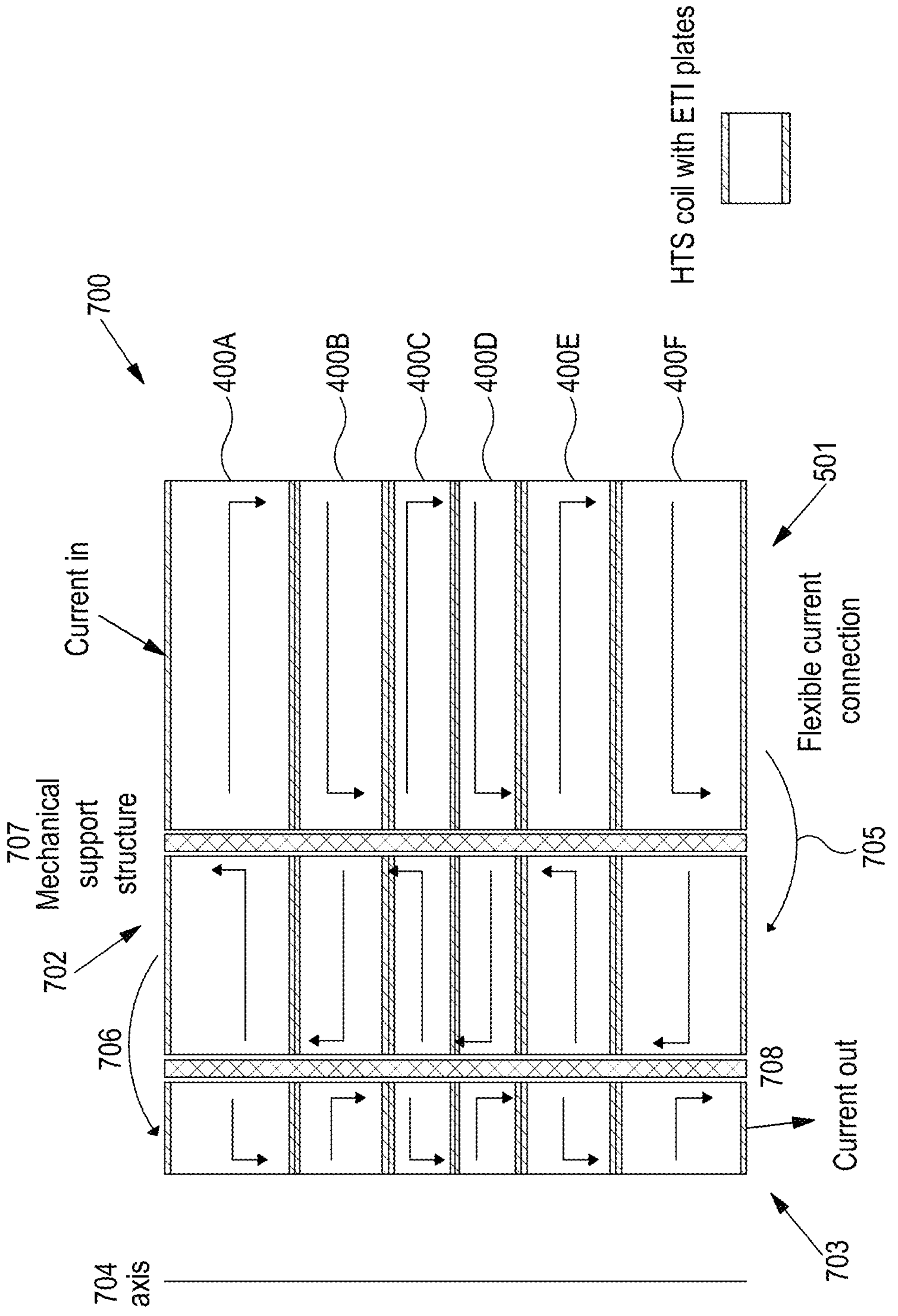
FIG. 7 is a schematic radial cross section view of an HTS magnet with multiple "stacked" coils.

FIG. 7 shows a radial cross section through an HTS magnet 600 which is able to produce very high magnetic fields in a compact, robust and straightforward manner.

The HTS magnet 700 comprises radially nested stacks 701, 702, 703 of the HTS magnets 400 described above. For example, the radially outermost stack comprises HTS magnets 400A-F arranged axially, with adjacent magnets electrically connected though their respective ETI plates. The ring joints formed by the ETI plates are arranged so that the current flow alternates between axial flow (between adjacent coils) and radial flow (around the windings of each coil), as indicated by the arrows overlaid on the HTS magnets 400A-F in FIG. 6. As for the HTS magnet 400 described with reference to FIG. 4, the coils of adjacent magnets are wound in opposite directions so that the magnetic field along the axis 704 of the magnet is maximised. The other two nested magnet stacks 702, 703 have a similar configuration in order to reinforce the magnetic field generated by the outer stack 701. Radial joints/connections 705, 706 are formed between the terminating ETI plates of adjacent stacks to allow electrical current to flow from one stack to flow into the next. In the example shown in FIG. 6, current is supplied to the magnet 700 through the top ETI plate of the uppermost HTS magnet 400A of the outer stack 701. After flowing through the stack 701 as described above, the current then flows radially through joint 705 into the outer nested stack 702. Similarly, after flowing through this stack 702, the current then flows radially into the inner nested stack 703 through joint 706. Finally, after flowing through the inner nested stack 703, the current exits the magnet 700 through the bottom ETI plate of the lowermost HTS magnet of the inner nested stack 703.

Although in the exemplary magnet 700 shown in FIG. 7, there are three stacks 701, 702, 703, each with 6 HTS coils, any number of stacks and/or coils could of course be used. The stacks may also have different numbers of coils to provide greater flexibility in the design of the magnet.

Composing the HTS magnet 700 from many smaller HTS magnets ("coil subdivision") provides a number of advantages. In particular, as described below, coil subdivision allows problems with stress limitations of HTS tapes to be overcome and more optimal magnet design by "grading" the subdivided coils according to their location in the magnet 700.

Considering the stress limitations of HTS tapes, the maximum permissible transverse tensile strength of HTS tapes 100 is typically around 10-50 MPa, which provides a practical limitation on the radial depth of windings which can be used. However, this problem can be avoided by coil subdivision subdividing a coil into several radially nested coils, as shown in FIG. 7, and inserting mechanical supports 707, 708 between the coils. Similarly, axial forces can be intercepted by subdividing along the axis of the magnet and inserting axial supporting structures (not shown).

Considering "grading" of the subdivided coils, in high field magnets, the magnetic field vector may vary significantly depending on the radial and/or axial location with the magnet. For HTS magnets, this means that the parameters characterising the operation of the magnet as a superconductor, such as the critical current, are also location dependent. A more optimal design of magnet 700 can therefore be obtained by grading the HTS tape 100 according to where it is located in the magnet. For example, to achieve the highest magnetic field possible, and for quench management, it is desirable to maximise the ratio (gamma) of the current to the critical current ($I/I_c$) everywhere in the magnet. Grading can be done by varying the number of HTS tapes per turn/winding, the tape width or thickness, or the tape type (i.e. manufacturer or HTS materials used).

It is often the case that sensors (such as temperature or strain probes) must be embedded in HTS magnets for monitoring purposes. Further items, such as heaters, may also be required for quench protection purposes. It is desirable for the HTS coil and ancillary items to be separate objects, such that the two can be manufactured separately and replaced independently in the event of a failure. A suitably adapted ETI plate can be made to accommodate many sensors or other items that need not be embedded directly in the windings of the HTS coil.

Figure 8:
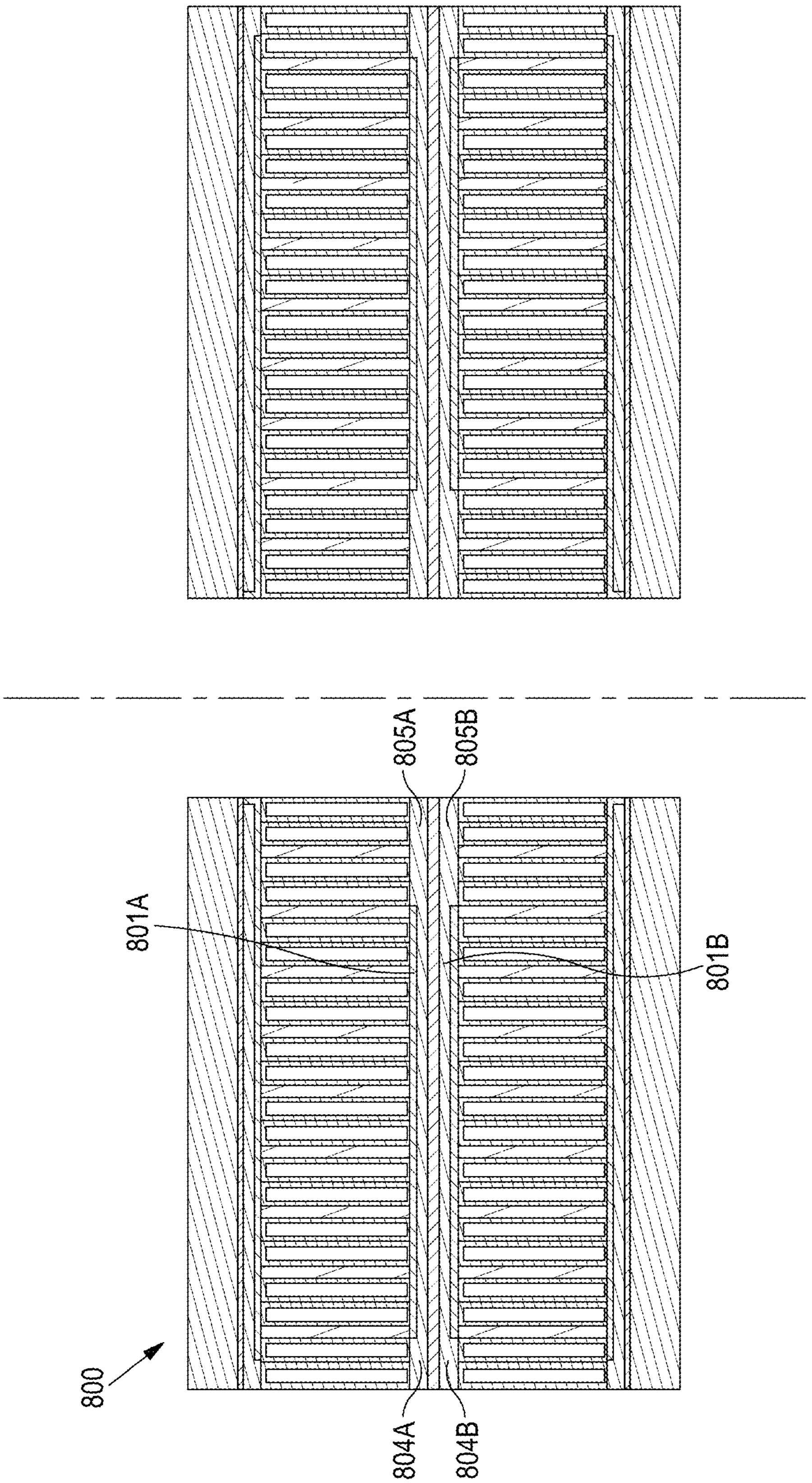
FIG. 8 is a schematic cross sectional view of another HTS magnet.

FIG. 8 shows a cross section through an HTS magnet 800 which is similar to the HTS magnet 500 shown in FIG. 5, except that each of the adjacent ETI plates 801A, 801B comprises an inner ring conductor 804A, 804B and an outer ring conductor 805A, 805B.

Figure 9:
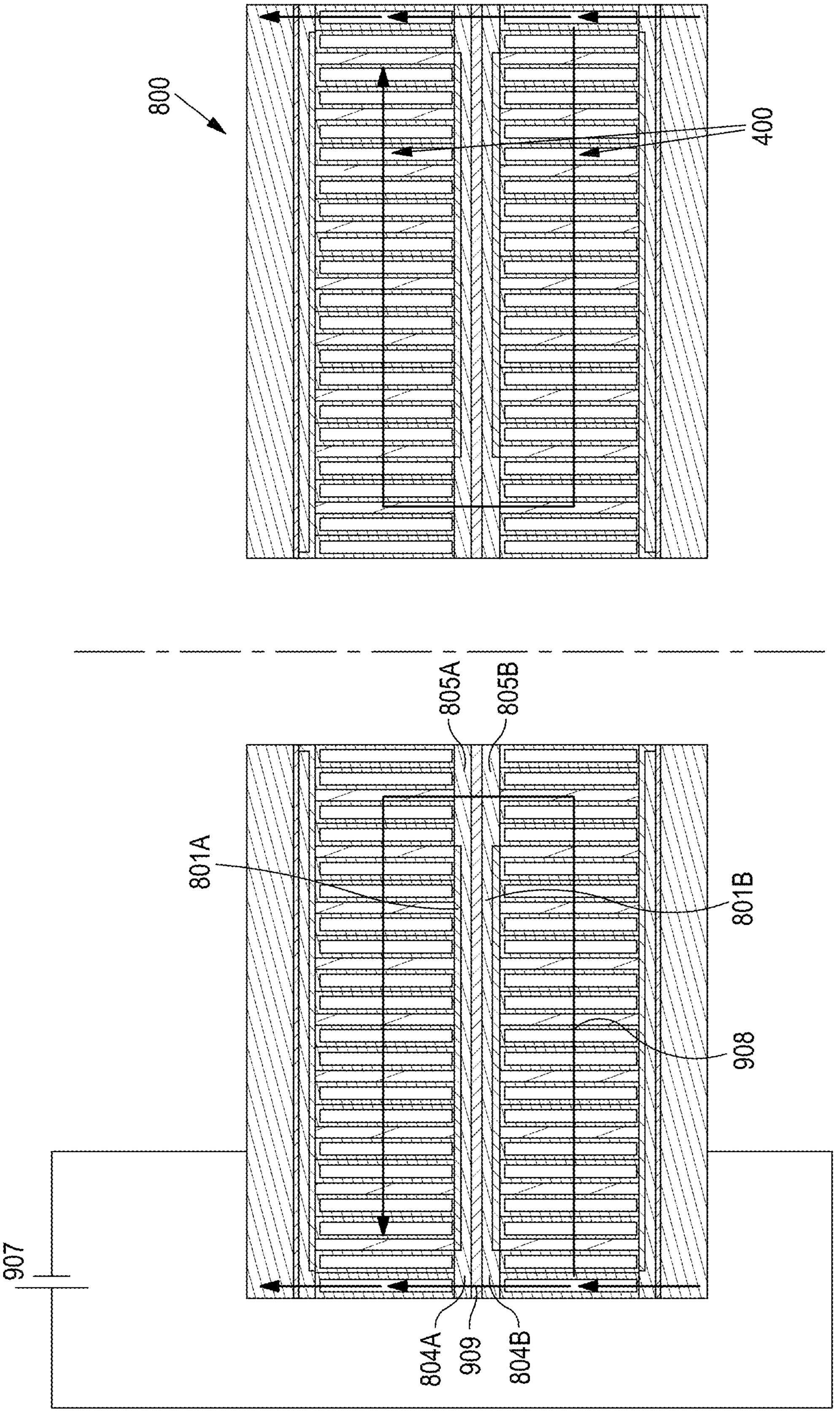
FIG. 9 is a schematic cross sectional view of the HTS magnet of FIG. 8 showing the electrical current flowing through the magnet when a power supply is connected across the coils.

As shown in FIG. 9, the inclusion of two ring conductors on each plate provides two alternative paths 908, 909 for current to flow through the magnet 800 when a power supply 907 is connected across the pair of coils. One path 908, is the same as the path described with reference to FIG. 4, i.e. the current flows around the windings of each coil 400 in turn, via the inner ring conductors 805A, 805B. The other path 909 "short-circuits" or circumvents path 908 by providing an electrical connection between the outer windings of the coils 400. In this case, the current flows into one of the coils 400 through its outer winding(s) and out of the coil through outer ring conductor 804B, instead of passing around the other windings of the coil. Similarly, the current passes into the outer windings of the other coil through outer ring conductor 804A, between their axial edges and out of the coil, without passing around the other windings of the other coil.

The proportion of the current which flows along each path 908, 909 is governed by the relative electrical resistances of the paths, which can be controlled by varying the electrical resistances of the outer and inner ring conductors 804A, 804B, 805A, 805B and/or the electrical resistances associated with the electrical contacts made by the ring conductors to the windings of the coils 400. The longer, circuitous path 908 can be favoured over the shorter, more direct path 909, such that most of the current flows radially in and out of the coils 400, by making the electrical resistance of direct path 909 much greater than that of circuitous path 908. This is achieved, for example, by making the areas of the outer ring conductors 804A, 804B smaller than the areas of the inner ring conductors 805A, 805B. Although a small amount of leakage current passes through path 909 and does not contribute to the magnetic field produced by circulation of the current through the windings of the coils 400, the coils 400 can be charged up to full critical current at the inner windings, and the additional leakage current can be carried by the outer windings, since they have a higher critical current in this lower magnetic field region. Once the magnet 800 is charged, the power supply 907 may be disconnected such that the current flows around the coils 400 in a closed loop.

Figure 10:
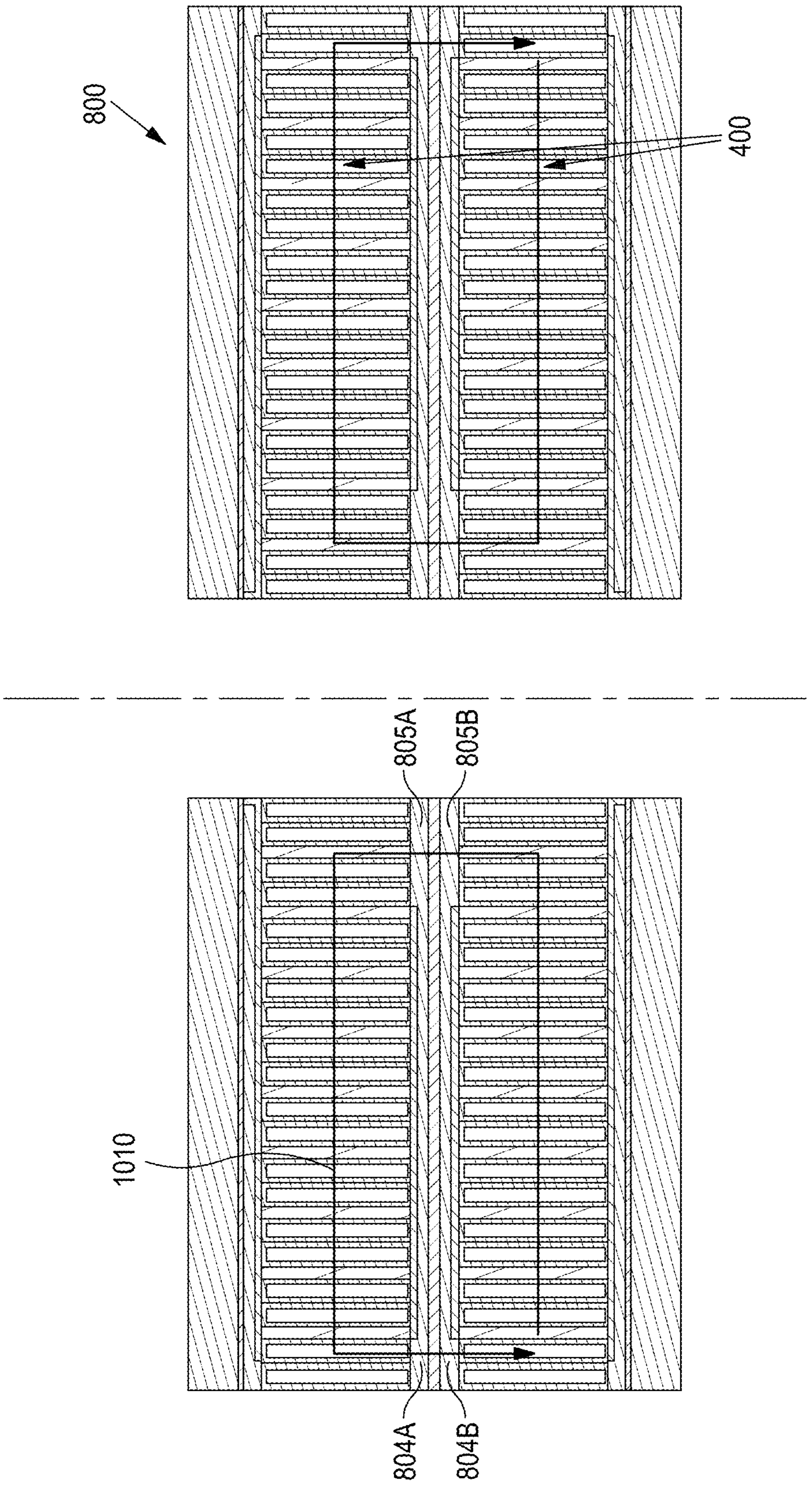
FIG. 10 is a schematic cross sectional view of the HTS magnet of FIGS. 8 and 9 showing the electrical current flowing through the magnet after the power supply has been disconnected.

FIG. 10 shows the path 1010 of a "trapped" current flowing within the magnet 800 after the power supply 907 has been disconnected. In this case, the current flows around a closed loop passing through the windings of the coils 400 and through each of the ring conductors 805B, 805A, 804A, 804B in turn. As the coils 400 are superconducting, the current is able to flow around path 1010 for long periods before decaying, i.e. the circulating current, and the magnetic field it generates, are "semi-persistent".

The time constant associated with the decay of the circulating current is defined by the ratio (L/R) of the magnetic self-inductance of the coil (L) to its electrical resistance (R). Consider, for example, a magnet which has coils having an inner diameter of 50 mm and an outer diameter of 98 mm, a self-inductance of ~2 mH, and electric joints of typical resistance ~1-5 nΩ in liquid nitrogen (i.e. an estimated combined resistance of the inner and outer electrical joints of ~10 nΩ). The L/R time constant of this magnet would be approximately 200,000 seconds, i.e. 2.3 days.

A large time constant is also associated with a large "charging" time, i.e. the time to establish a steady state distribution of current between the paths 908, 909 when the power supply is connected. To minimise the charging time, it is beneficial to increase the resistance of path 908 while charging (i.e. in the configuration shown in FIG. 9). This can be achieved with a variable resistor or switch incorporated into the outer electrical joint provided by the outer ring conductors 804A, 804B. For example, an HTS switch comprising HTS material may be provided between the outer ring conductors 804A, 804B. During charging, the switch is "off" (in a non-superconducting state) to provide a large resistance and consequently quick charging. This is achieved by, for example, heating the HTS material above its critical temperature. The switch is subsequently switched "on" (e.g. no longer heated, or rather, cooled) to close the current path 1010 and the power supply disconnected.

One important application of HTS magnets such as those described above is in a type of fusion reactor known as tokamak. A tokamak features a combination of strong toroidal magnetic field, high plasma current and, usually, a large plasma volume and significant auxiliary heating, to provide hot, stable plasma. This allows tokamaks to generate conditions so that fusion can occur. The auxiliary heating (for example via tens of megawatts of neutral beam injection of high energy hydrogen, deuterium or tritium) is necessary to increase the temperature to the sufficiently high values required for nuclear fusion to occur, and/or to maintain the plasma current.

The magnet coils on a tokamak can be divided into two groups. The poloidal field coils are horizontal circular coils wound with their centre lying on the central column of the tokamak, and produce a poloidal field (i.e. one which is substantially parallel to the central column). The toroidal field coils are wound vertically through the central column, and around the outside of the plasma chamber (the "return limbs") to produce a toroidal field (i.e. one which is circular around the central column). The combination of the poloidal and toroidal fields produces a helical field within the plasma chamber which keeps the plasma confined.

The currents required to generate the toroidal field are very large. Designs for tokamaks therefore increasingly involve the use of superconducting materials in the field coils. For a compact spherical tokamak, the diameter of the central column should be as small as possible. This presents conflicting requirements, as the current density which can be achieved, even with superconducting materials, is limited.

The HTS magnets described herein are particularly suitable for use in tokamaks, in particular spherical tokamaks, e.g. to produce either of (or both) the poloidal or toroidal fields.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. For example, although the coils above have been described as having HTS tapes 100 arranged in a "type 0" configuration, other configurations can also be used, e.g. "type 1" and "type 2" (as described, for example, in WO2018/078326). Similarly, although in the examples described above, the coils are generally connected in series across a power supply, it is also possible to connect the coils in parallel across the power supply. Thus, the present invention should not be limited by any of the above-described exemplary embodiments, but should be defined only in accordance with the following claims and their equivalents.

What is claimed is:

1. A High Temperature Superconductor (HTS) magnet comprising:

a coil formed of nested concentric windings, each winding comprising HTS material; and a conductor element through which to supply electric current to charge the coil, the conductor element comprising an electrical contact surface providing electrical contact between the conductor element and an axial edge of the coil at least partially around the coil and to at most a portion of the windings, the portion of the windings including either one of an innermost winding or an outermost winding.

2. An HTS magnet according to claim 1, wherein each winding comprises one or more HTS tapes, each HTS tape comprising HTS material and electrically conductive cladding electrically connected to the HTS material.

3. An HTS magnet according to claim 1 wherein the electrical contact surface provides electrical contact around more than 20% of the coil.

4. An HTS magnet according to claim 1, wherein the electrical contact surface is ring-shaped.

5. An HTS magnet according to claim 1 and comprising a conductor plate extending at least partly across the axial edge of the coil, the conductor element formed integrally with the conductor plate or provided thereon.

6. An HTS magnet according to claim 5, wherein the conductor element protrudes from a face of the conductor plate and the HTS magnet further comprising an electrically resistive layer electrically insulating the face of the conductor plate from the axial edge of the coil.

7. An HTS magnet according to claim 6 and comprising an interfacial conductor layer between the electrically resistive layer and the axial edge of the coil to transfer heat and/or electrical current from the axial edge of the coil.

8. An HTS magnet according to claim 7, wherein the interfacial conductor layer comprises a solderable metal.

9. An HTS magnet according to claim 7, wherein the interfacial conductor layer is patterned by varying its thickness.

10. An HTS magnet according to claim 7, wherein the coil comprises electrical insulation between the windings.

11. An HTS magnet according to claim 5 and comprising one or more heaters disposed between the plate and the coil.

12. An HTS magnet according to claim 1, wherein the conductor element is a first conductor element comprising a first electrical contact surface, the HTS magnet further comprising a second conductor element comprising a second electrical contact surface for receiving electric current from the coil, the second electrical contact surface providing electrical contact to an opposite axial edge of the coil at least partially around the path of at least one of the windings other than the at least one of the windings contacted by the first electrical contact surface.

13. An HTS magnet according to claim 1, wherein the coil is a first coil and the conductor element is a first conductor element comprising a first electrical contact surface, the HTS magnet further comprising:

a second coil formed of nested concentric windings, each winding comprising HTS material; and a second conductor element through which to receive electric current from the second coil and comprising a second electrical contact surface providing electrical contact between the second conductor element and an axial edge of the second coil at least partially around the second coil and to at most a portion of the windings of the second coil, the portion of the windings including either one of an innermost winding or an outermost winding;

wherein the first coil and the second coil are stacked axially and are electrically connected to one another through the first conductor element and the second conductor element.

14. An HTS magnet according to claim 13, wherein the axially stacked first coil and second coil are wound in opposite directions and each of the first electrical contact surface and the second electrical contact surface provide electrical contact either to the innermost winding of the respective first and second coils or to the outermost winding of the respective first and second coils.

15. An HTS magnet according to claim 1, wherein the portion of the windings comprises only the innermost winding or only the outermost winding.

16. An HTS magnet according to claim 1 further comprising a power supply connected across the coil to supply electric current to the coil through the electrical contact surface to the axial edge of the coil.

17. A tokamak comprising an HTS magnet according to claim 1.

18. A method of supplying electrical current to charge a High Temperature Superconductor (HTS) magnet, the HTS magnet comprising a coil formed of nested concentric windings, each winding comprising HTS material, the method comprising:

applying an electrically resistive layer to partially cover an axial face of the coil;

applying an electrical conductor plate over the dielectric or electrically resistive layer;

forming an electrical contact between the conductor plate and the axial face of the coil at least partially around the coil; and supplying an electrical current to the electrical conductor plate to charge the HTS magnet through the electrical contact.

19. The method of claim 18 and comprising applying an interfacial conductor layer between the electrically resistive layer and the coil, the interfacial conductor layer to transfer heat and/or electrical current from the face of the coil.

20. An interface plate for making an electrical connection to an axial edge of a substantially planar coil formed of nested concentric windings, the interface plate comprising:

an electrically conductive plate;

an electrically conductive element formed integrally with the plate or provided thereon, the element for providing electrical contact between the plate and the coil;

an electrically resistive layer on the electrical conductor plate for providing an electrically insulating barrier adjacent to the electrical conductor element; and an interfacial conductor layer extending across the electrically resistive layer and electrically insulated from the electrically conductive plate and the electrically conductive element by the electrically resistive layer, the interfacial conductor layer configured to transfer heat and/or electrical current from the edge of the or each winding.

21. A high temperature superconductor (HTS) magnet comprising:

a coil comprising a plurality of turns wound around an axis, each turn comprising HTS material, the coil having an axial face, an inner radius and an outer radius;

a conductor element through which to supply electric current to charge the coil, the conductor element making an electrical connection to the axial face of the coil at either the outer radius or the inner radius of the coil.

22. An HTS magnet according to claim 21, the coil having a second axial face and the HTS magnet further comprising a second conductor element through which to receive electric current from the coil, the second conductor element making an electrical connection to the second axial face at the other of the outer radius or the inner radius of the coil.

23. An HTS magnet according to claim 22 wherein the first conductor element makes an electrical connection to one of an innermost turn or an outermost turn of the coil, and the second conductor elements makes an electrical connection to the other of the innermost turn or the outermost turn of the coil.

24. An HTS magnet according to claim 21 wherein the coil is a first coil and the conductor element is a first conductor element and makes an electrical connection to the axial face of the first coil at the inner radius of the first coil, the HTS magnet further comprising:

a second coil comprising a plurality of turns wound around an axis, each turn comprising HTS material, the second coil having an axial face, an inner radius and an outer radius; and a second conductor element through which to receive electrical current from the second coil, the second conductor element making an electrical connection to the axial face of the second coil at the inner radius of the second coil;

the first coil and the second coil being stacked axially such that the turns of the first coil wind in an opposite direction to the turns of the second coil, and are electrically connected via the first conductor element and the second conductor element.

25. An HTS magnet according to claim 21 further comprising a power supply connected across the coil to supply electric current to the coil through the electrical connection to the axial face of the coil.

* * * * *